UNITED STATES PATENT OFFICE.

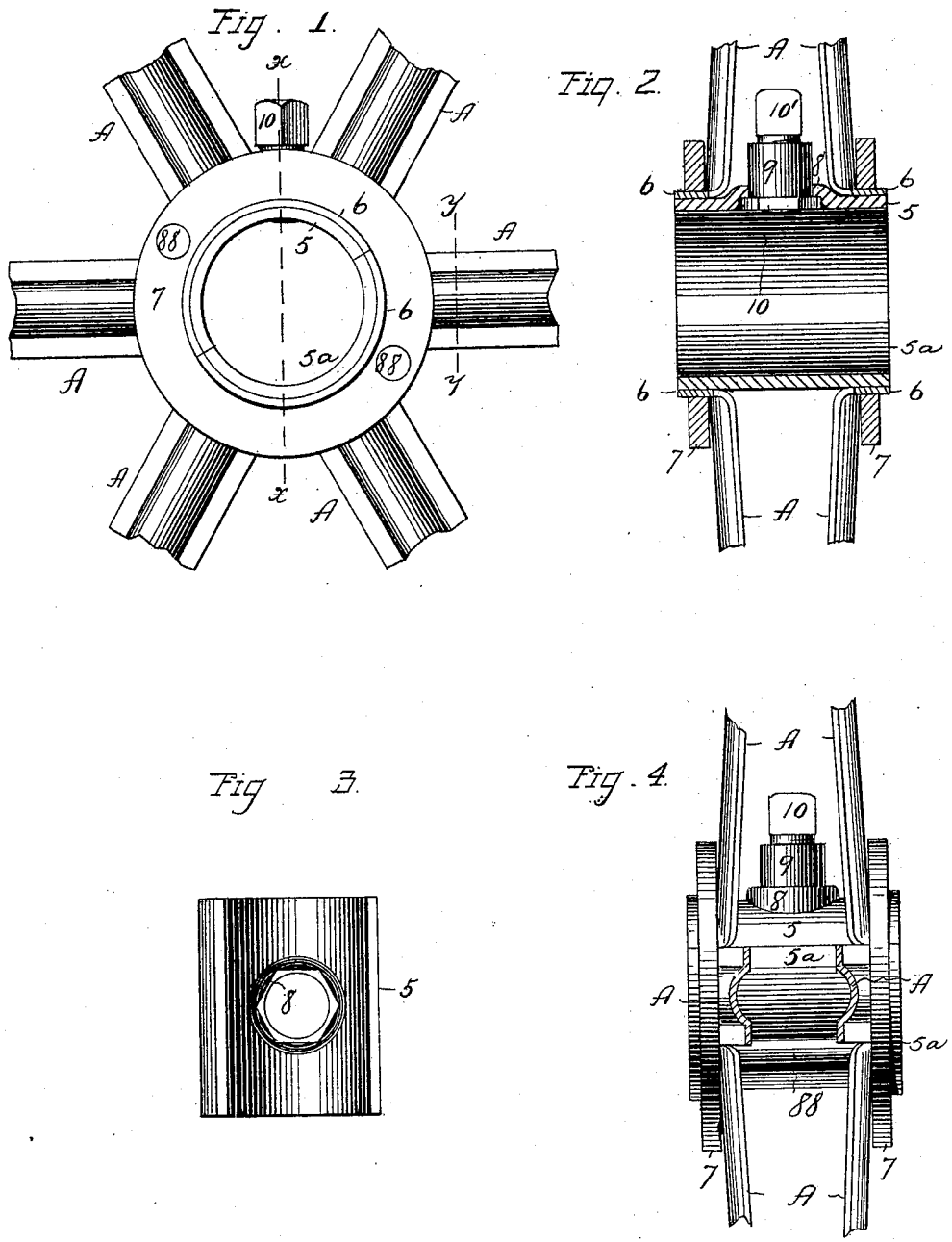

THOMAS CORSCADEN, OF NEW BRITAIN, CONNECTICUT, ASSIGNOR TO THE AMERICAN PULLEY COMPANY, OF PHILADELPHIA, PENNSYLVANIA.

PULLEY-HUB.

SPECIFICATION forming part of Letters Patent No. 612,022, dated October 11, 1898.

Application filed May 6, 1897. Serial No. 635,409. (No model.)

*To all whom it may concern:*

Be it known that I, THOMAS CORSCADEN, a citizen of the United States, residing at New Britain, in the county of Hartford and State of Connecticut, have invented certain new and useful Improvements in Pulley-Hubs, of which the following is a specification.

My invention relates to improvements in pulley-hubs; and the main object of my improvement is to provide a simple and convenient way of forming a set-screw socket in a sheet-metal pulley-hub.

In the accompanying drawings, Figure 1 is a side elevation of my pulley-hub and spoke-arms made in accordance with my improvement. Fig. 2 is a sectional view thereof on the line $x\ x$ of Fig. 1, partly in side elevation. Fig. 3 is a detached reverse plan view of one-half of my hub-shell, and Fig. 4 is a sectional elevation thereof on the line $y\ y$ of Fig. 1.

I form the hub-shells 5 and $5^a$ of sheet metal, and they constitute the principal or foundation part of the hub. The spoke-arms A are provided with outwardly-turned flanges 6, which rest upon the peripheries of the hub-shells and are secured in place by the rings 7, which may, if desired, be held against working endwise out of place by means of the rivets 88, which extend from ring to ring. In the half hub-shell 5, before the parts are assembled, I swage a middle boss 8, the interior of which forms a socket, preferably hexagonal. This middle boss is also centrally perforated, and within it I place the set-screw hub or socket 9, the body of which extends up through the perforation in the shell and the base of which is provided with an angular flange 10, that fits the hexagonal socket of said boss and prevents the set-screw hub from rotating therein. This socket is provided with an ordinary set-screw 10' for holding the pulley on the shaft in the ordinary manner. If desired, the set-screw hub 9 may be forced into the central orifice of the boss 8 with sufficient force to make it stay in place, (the parts being closely fitted,) or it may be loosely fitted therein and slipped into place just before the pulley is placed upon the shaft, after which the shaft will prevent the set-screw socket from working out of place. By my improvement I provide the sheet-metal shell of the pulley-hub with a proper set-screw socket in a simple and inexpensive manner.

I have shown and described the holding-ring 7 as the best way known to me of holding the parts of the hub together; but it is obvious that my improvement relating to providing the hub-shell with the set-screw socket or hub is the same, no matter what the construction of the other parts of the pulley may be.

It will be seen that I form the boss 8 with an interior socket of an angular form and form the set-screw hub 9 of a corresponding form, fitted thereto so that the said hub is held against rotation within said boss by means of a projection or projections on one part that engages a recess or recesses in the other part, and while the hexagonal or other angular form is the preferred construction, the essential feature of the inserted hub of the shell 5 resides in simple means to prevent the hub from rotating in its socket. I wish it distinctly understood that I desire to cover all such changes as may fairly fall within the spirit and scope of my invention.

I claim as my invention—

In a pulley-hub the combination of the hub-shells having an outwardly-projecting tubular boss 8, the interior of which forms a socket, with the set-screw hub having a body extended through and projecting beyond said boss and a flanged angular base at its inner end that fits the socket within said tubular boss, substantially as described.

THOMAS CORSCADEN.

Witnesses:
C. G. REYNOLDS,
F. G. WILSON.